(12) United States Patent
Marko, Jr.

(10) Patent No.: US 9,211,850 B2
(45) Date of Patent: Dec. 15, 2015

(54) LICENSE PLATE FRAME AND METHOD OF USE

(71) Applicant: Edward J. Marko, Jr., Fort Lauderale, FL (US)

(72) Inventor: Edward J. Marko, Jr., Fort Lauderale, FL (US)

(*) Notice: Subject to any disclaimer, the term of this patent is extended or adjusted under 35 U.S.C. 154(b) by 0 days.

(21) Appl. No.: 14/326,098

(22) Filed: Jul. 8, 2014

(65) Prior Publication Data

US 2015/0075043 A1 Mar. 19, 2015

Related U.S. Application Data

(60) Provisional application No. 61/843,995, filed on Jul. 9, 2013.

(51) Int. Cl.
*G09F 7/00* (2006.01)
*B60R 13/10* (2006.01)

(52) U.S. Cl.
CPC .................... *B60R 13/105* (2013.01)

(58) Field of Classification Search
USPC .......................................................... 40/209
See application file for complete search history.

(56) References Cited

U.S. PATENT DOCUMENTS

| | | | |
|---|---|---|---|
| 2,526,460 A * | 10/1950 | Crocella | 40/204 |
| 2,603,013 A * | 7/1952 | Sherwood | 40/209 |
| 2,910,793 A * | 11/1959 | Easton et al. | 40/209 |
| 4,170,838 A | 10/1979 | Bott | |
| 5,012,602 A | 5/1991 | Storey | |
| 5,381,618 A | 1/1995 | Singleton | |
| 5,404,664 A | 4/1995 | Brooks et al. | |
| 5,979,339 A | 11/1999 | Smith | |
| 6,481,126 B2 | 11/2002 | Paulhill | |
| 7,111,420 B2 | 9/2006 | Glickman | |
| 7,257,912 B2 | 8/2007 | Yang | |
| 7,752,785 B2 | 7/2010 | Beer et al. | |
| 8,136,854 B2 | 3/2012 | Rich | |
| 2010/0257763 A1* | 10/2010 | Hu | 40/209 |

* cited by examiner

*Primary Examiner* — Joanne Silbermann
(74) *Attorney, Agent, or Firm* — Kevin P. Crosby; GrayRobinson, P.A.

(57) ABSTRACT

A license plate frame comprising a license plate frame body defining a centrally located substantially unobstructed registration plate viewing area therethrough. The unobstructed viewing area is defined by a continuous interior peripheral edge. In one embodiment, a license plate peripheral support wall extends rearward from a mounting or rear surface of the frame body. The peripheral support wall is sized and shaped to nest with a peripheral edge of a registration plate. The peripheral support wall may be setback from the interior peripheral edge forming a plate surface retention lip. One or more retention tabs extend inwardly from the support wall, each forming a gap between a tab exterior surface and the retention lip or the continuous peripheral edge. The registration plate is positioned between the tab exterior surface and the retention lip. The assembly is affixed to a vehicle by inserting fasteners through apertures in each of the registration plate and the retention tabs.

19 Claims, 7 Drawing Sheets

LICENSE PLATE FRAME AND METHOD OF USE

REFERENCE TO RELATED APPLICATION

This application claims priority under 35 U.S.C. §119(e) to U.S. Provisional Patent Application No. 61/843,995 filed Jul. 9, 2013, and under 35 U.S.C. 120 as a continuation-in-part to related United States Design Patent Application Serial No. 29/455,845 filed on May 24, 2013, both of which are incorporated herein in their entireties.

FIELD OF THE INVENTION

The present disclosure generally relates to a frame for a motor vehicle license plate. More particularly, the present disclosure relates to a license plate frame comprising a framed registration plate viewing area enabling an unobstructed viewing area of a registration plate.

BACKGROUND OF THE INVENTION

License plates are issued by governmental agencies to uniquely identify a respective vehicle via a registration identifier. The license plates are commonly fabricated of a metal or plastic material having a standard length, a standard width, a generally consistent thickness, and a tolerance compensating mounting configuration. The registration identifier is a numeric or alphanumeric code that uniquely identifies the vehicle within the issuing region's database. In some countries, the identifier is unique within the entire country, while in others it is unique within a state or province. License plates can be alternatively referred to as tags, number plates, and the like.

The standardized dimensions of the license plates can vary from region to region. For example, the United States has one standard size and Europe has a different, shorted and elongated standardized size. The dimensions can vary for the respective application. Motorcycle license plates are generally smaller than standard motor vehicle license plates. The standard United States license plate is generally 6 in×12 in while the standard plate in Europe is generally 20.5 in×4.5 in. When referring to "standard identification plate" in this application, reference is being made to the standard United States identification plate. However, the application of the present invention is not limited to identification plates from the United States and can be applied to any identification plate.

Most jurisdictions mandate a registration plate be attached to both a front end and a rear end of a vehicle. Certain jurisdictions or vehicle types (such as motorcycles) may have relaxed requirements, only mandating attachment of one registration plate to the rear end of a vehicle.

Registration plates are usually attached directly to a vehicle or to a license plate frame that is subsequently attached to the vehicle. It is common for the vehicle service center or the dealership to install license plate frames bearing advertisements for respective vehicle service center or the dealership. Customized frames are offered providing the vehicle owner a means to personalize their vehicle. Registration plates are designed to conform to standards with regard to being read by eye in day or at night, or by electronic equipment.

Registration plates commonly include indicia including the unique registration identifier, an expiration reference, a jurisdiction identifier, and the like. Laws and other motor vehicle regulations governing placement of objects partially or completely concealing a viewing area of the registration plate vary between jurisdictions.

License plate frames commonly include a circumferential frame, a series of attachment tabs, and the like which may cover at least a portion of the government-mandated indicia applied to the registration plate. The license plate frames include a mounting aperture that is provided through the circumferential frame, a series of attachment tabs, and the like. One resulting effect from this configuration dictates that the circumferential frame, series of attachment tabs, and the like extend inward from a peripheral edge of the registration plate. The result is a configuration whereby the circumferential frame, series of attachment tabs, and the like could partially or completely cover one or more of the government mandated indicia elements.

What is desired is a license plate frame having an unencumbered license plate viewing area.

SUMMARY OF THE INVENTION

The basic inventive concept provides a license plate frame designed to support a registration plate while incorporating an unobstructed license plate viewing area.

A first aspect of the present invention provides a license plate frame comprising:

a license plate frame substrate bound between an exterior peripheral edge and an interior peripheral edge defining a registration plate viewing aperture forming an unobstructed license plate viewing area, the license plate frame substrate having an exposed surface and a mounting surface;

a registration plate retention wall extending rearward from the substrate mounting surface, wherein the registration plate retention wall is sized and shaped to follow a peripheral edge of a standard registration plate;

at least one registration plate retention tab extending from the registration plate retention wall towards a center of the plate viewing aperture, each of the at least one registration plate retention tabs being spatially arranged from the mounting surface, wherein a gap formed between facing surfaces of each of the at least one registration plate retention tabs and the mounting surface is of a dimension approximately that of a standard thickness of the registration plate; and a frame mounting aperture formed through each of the at least one registration plate retention tabs, wherein each frame mounting aperture is located in registration with a respective standard registration plate mounting aperture.

A second aspect of the present invention includes a plate surface retention lip extending between the registration plate retention wall and the registration plate viewing aperture.

In another aspect, the frame mounting aperture is formed as a slot.

In yet another aspect, the license plate frame comprises a pair of license plate retention tabs.

In yet another aspect, the license plate frame comprises two pair of license plate retention tabs, a first pair extending downward from an upper edge of the license plate frame and a second pair extending upward from a lower edge of the license plate frame.

In yet another aspect, the license plate frame substrate is manufactured of an elastically bendable material.

In yet another aspect, the license plate frame substrate is manufactured of at least one of metal, plastic, nylon, and the like.

In yet another aspect, the license plate frame can further comprise a peripheral wall extending rearward from the mounting surface, the peripheral wall following the frame exterior peripheral edge. The peripheral wall would extend rearward to a distance substantially equal to a rearward distance of the license plate peripheral support wall.

In use, the license plate frame is arched forward enabling insertion of a registration plate between each of the at least one license plate retention tab and the plate surface retention lip. An upper edge and lower edge of the registration plate is slid against the upper and lower (longitudinal) segments of the license plate peripheral support wall until a leading side edge of the registration plate engages with the respective segment or lateral portion of the license plate peripheral support wall.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
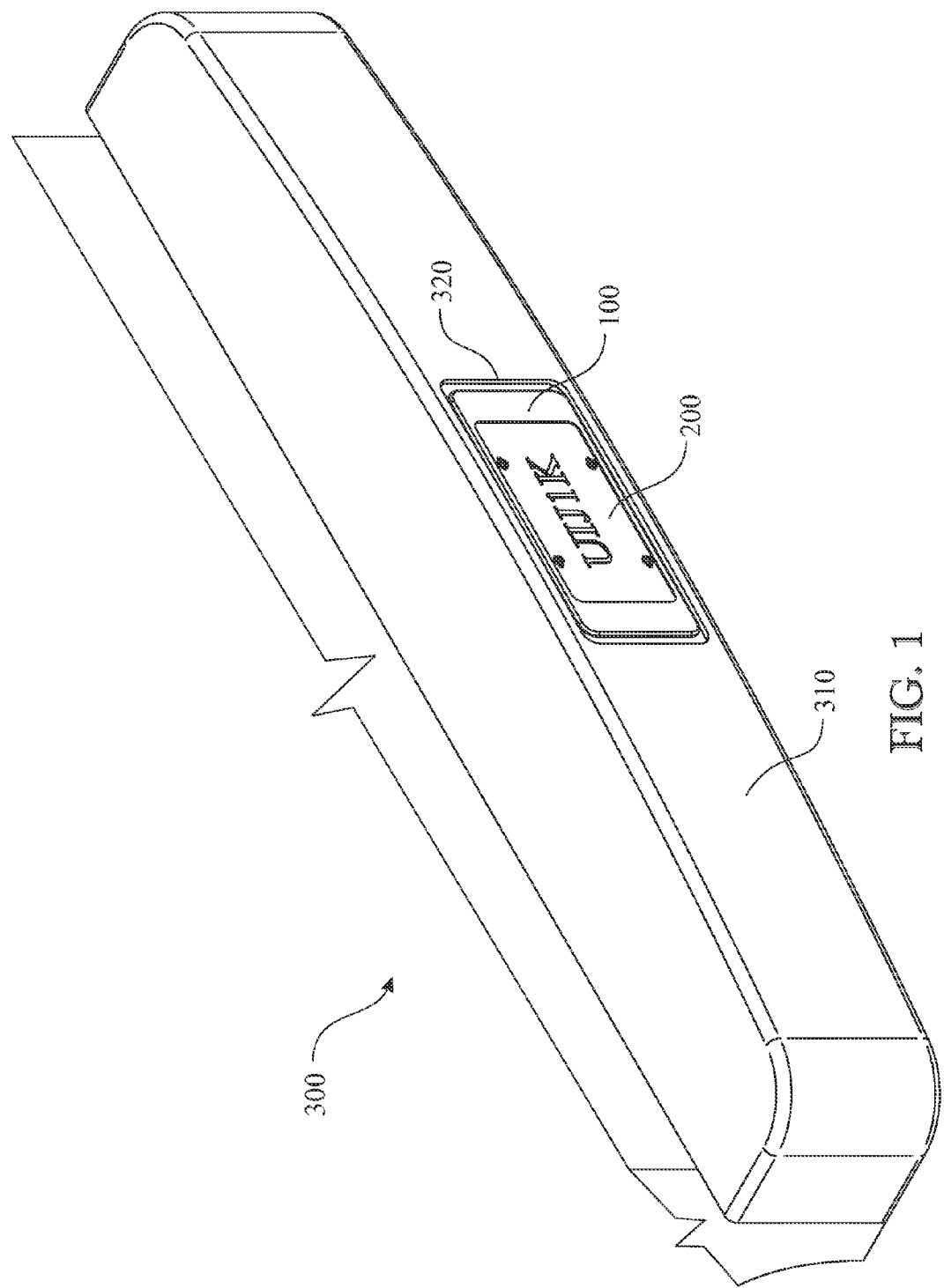
FIG. 1 presents an isometric view of a registration plate assembled to a license plate frame, which is affixed to a vehicle bumper in accordance with an exemplary embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
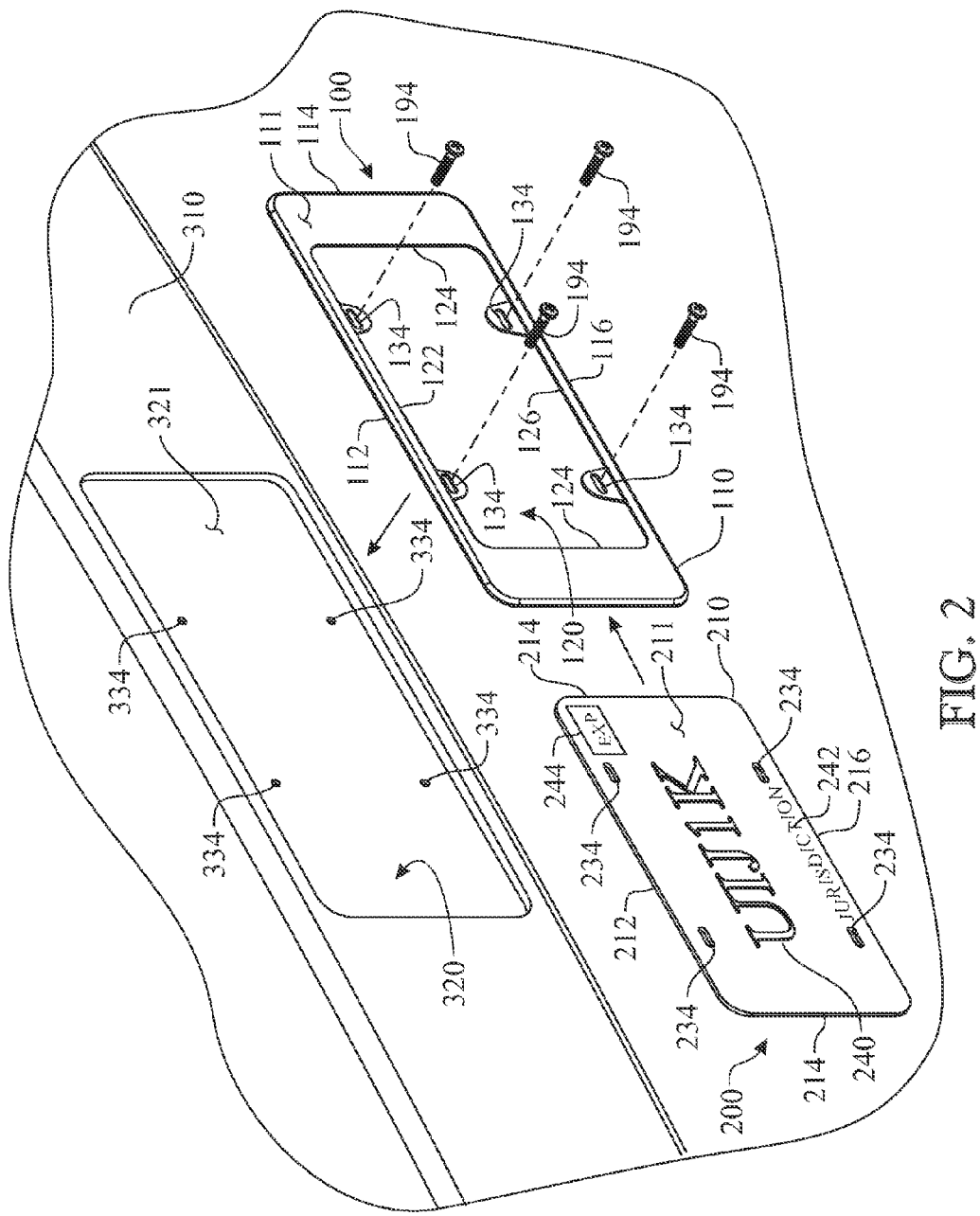
FIG. 2 presents an isometric exploded assembly view of the registration plate and license plate frame introduced in FIG. 1.

An exemplary registration plate 200 is presented in FIGS. 1 through 6. The registration plate 200 is fabricated of a generally planar registration plate substrate 210. The registration plate substrate 210 is bound by a plate peripheral edge, wherein the plate peripheral edge is defined by a plate peripheral upper longitudinal edge 212, a pair of plate peripheral side edges 214, and a plate peripheral lower longitudinal edge 216. The registration plate 200 includes indicia as required by a respective jurisdiction. The indicia can include a registration identifier 240, a jurisdiction identifier 242, and an expiration identifier 244. It is understood that the expiration identifier 244 can be provided in a format of a label, wherein the expiration identifier 244 is attached to the registration plate 200 using an adhesive. The locations of the registration identifier 240, jurisdiction identifier 242, and expiration identifier 244 are standardized by the issuing jurisdiction. At least one of the registration identifier 240, jurisdiction identifier 242, and expiration identifier 244 can be printed upon a planar registration plate viewed surface 211 of the registration plate 200 or the registration plate 200 can be embossed raising a portion of the registration plate viewed surface 211, wherein the embossing forms the alphanumeric characters of the registration identifier 240, jurisdiction identifier 242, and/or expiration identifier 244. A contrasting color can be applied to the embossed characters to enhance the readability of the alphanumeric characters of the registration identifier 240, jurisdiction identifier 242, and/or expiration identifier 244. Multiple plate mounting apertures 234 are formed through the registration plate substrate 210, wherein the plate mounting apertures 234 are arranged in a standardized pattern. By utilizing a standardized pattern, the pattern of the plate mounting apertures 234 is compatible with an associated mounting pattern integrated into commercially produced motor vehicles. An exemplary mounting pattern includes a series of license plate fastener receiving apertures 334 as illustrated in FIG. 2.

A license plate frame 100, in accordance with the present invention, enhances an appearance of a registration plate 200 affixed to a vehicle bumper 310 of a motor vehicle 300. In the exemplary embodiment the vehicle bumper 310 includes a license plate receiving cavity 320 defining a license plate backing surface 321. The license plate receiving cavity 320 is sized and shaped to receive a registration plate 200. A plurality of license plate fastener receiving apertures 334 are located in accordance with a regional standard for attachment of the registration plate 200 thereto.

It is understood that the registration plate 200 can be affixed to any suitable feature of the motor vehicle 300, including a rear cargo door, a tailgate, a rear body panel, and the like. The registration plate 200 is secured to the vehicle bumper 310 using a series of license plate fasteners 194. The license plate fastener 194 is preferably a threaded bolt or screw.

Each license plate fastener receiving aperture 334 is preferably a threaded fastener, such as a pem nut. Alternatively, each license plate fastener receiving aperture 334 can be an unthreaded bore that is accessible on both an outward surface of the vehicle bumper 310 and an undercarriage surface of the vehicle bumper 310, enabling attachment using a threaded bolt and a respective nut.

Figure 3:
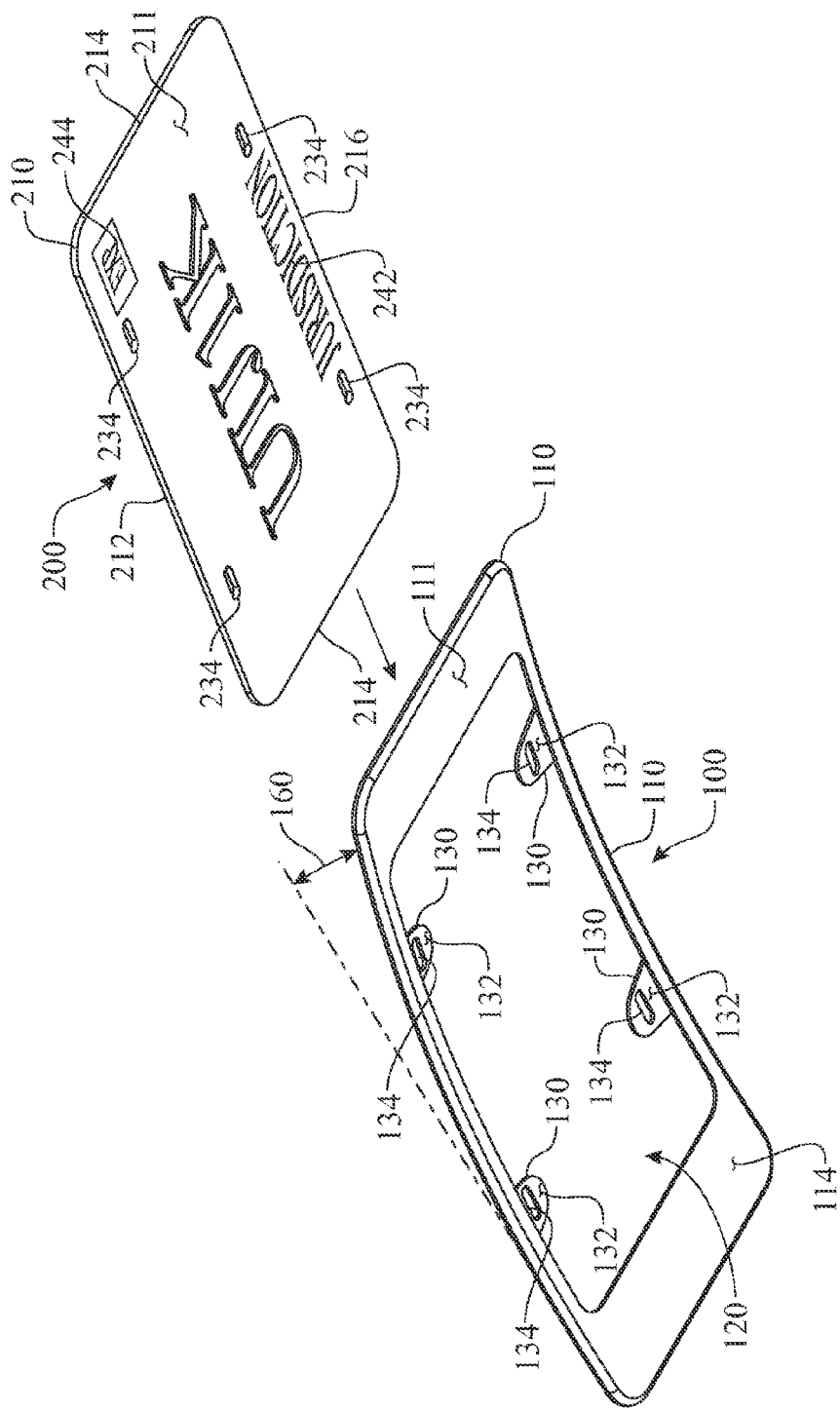
FIG. 3 presents a front isometric view illustrating a preparation step for assembling a registration plate to the license plate frame.
Figure 4:
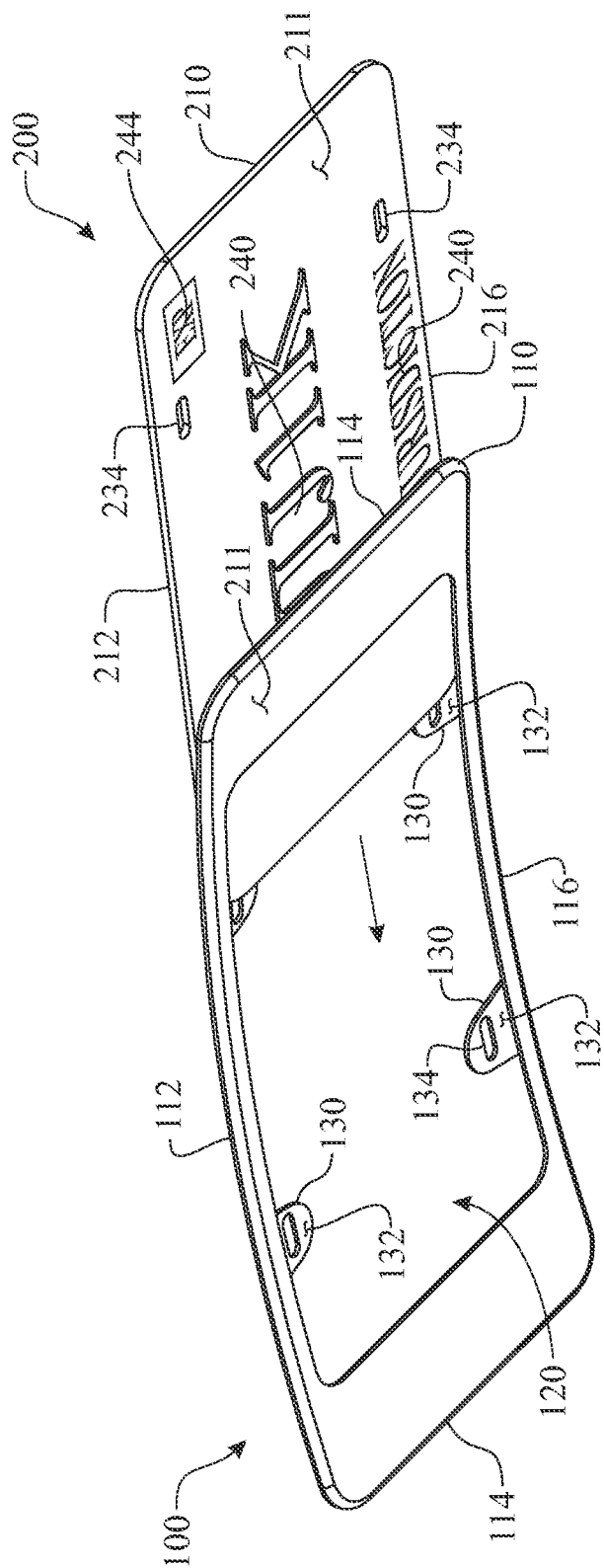
FIG. 4 presents a front isometric view illustrating a first installation step for assembling a registration plate to the license plate frame.
Figure 5:
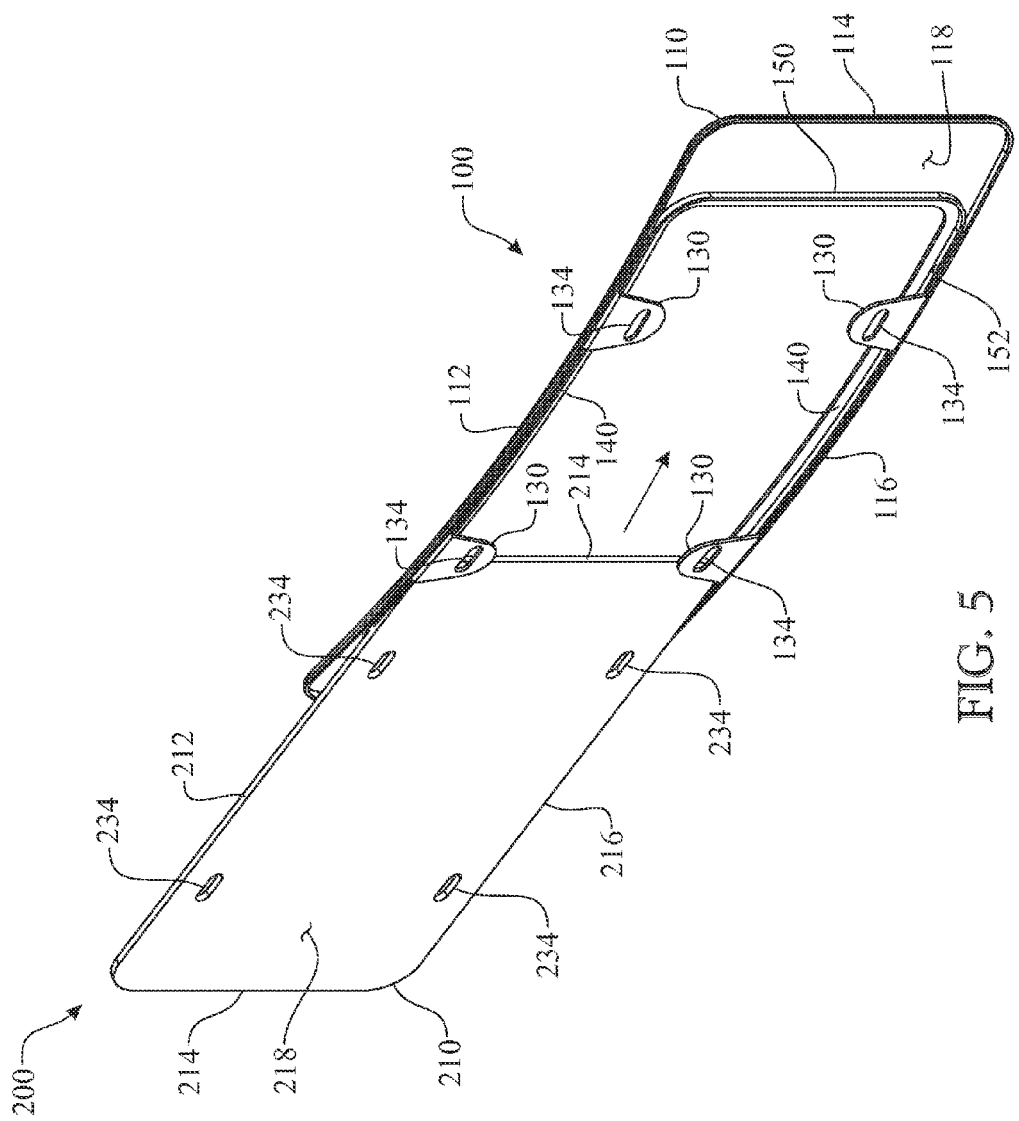
FIG. 5 presents a rear isometric view illustrating the first installation step for assembling the registration plate to the license plate frame.
Figure 6:
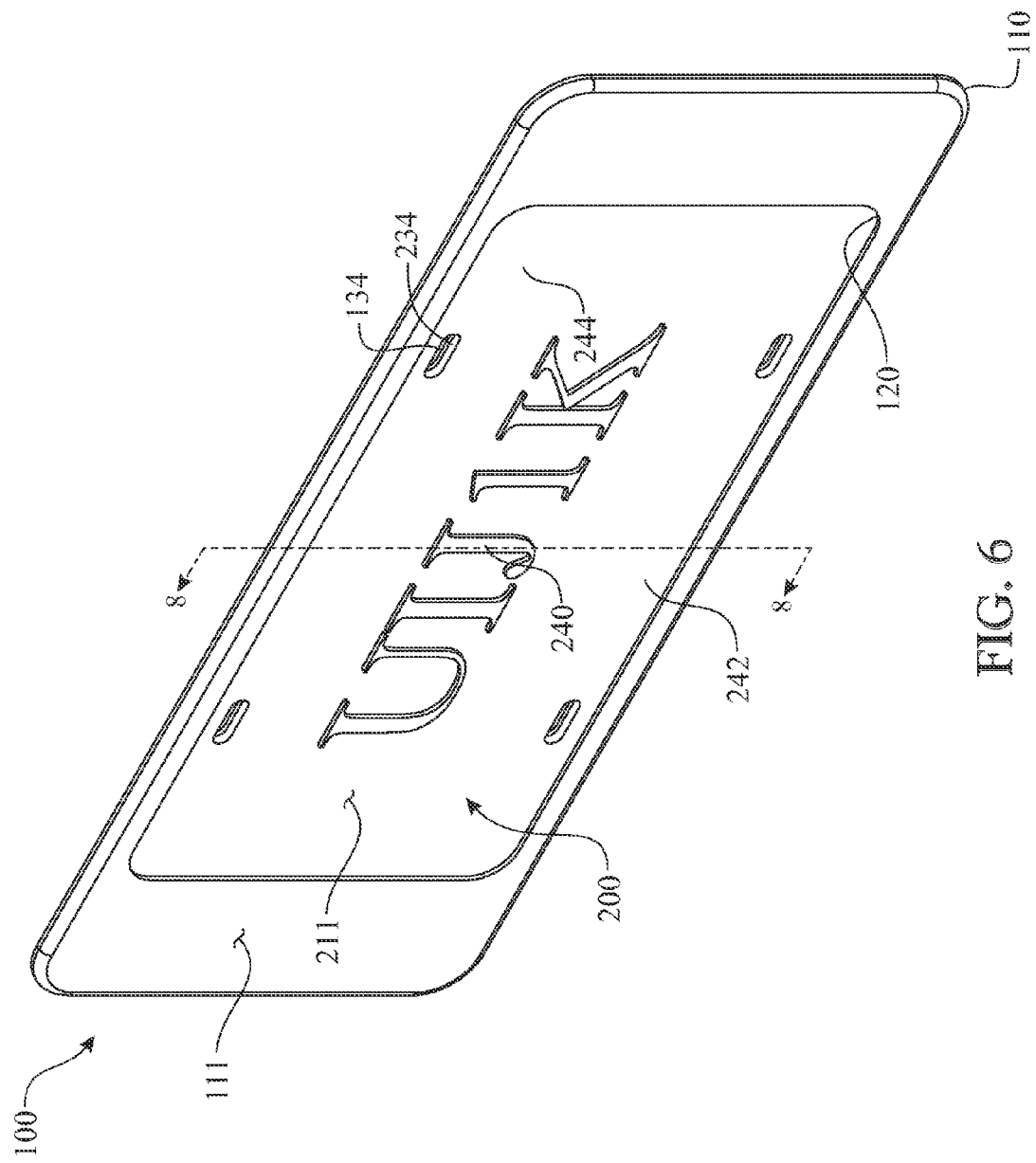
FIG. 6 presents a front isometric view illustrating a completed first installation step having the registration plate assembled within the license plate frame.
Figure 7:
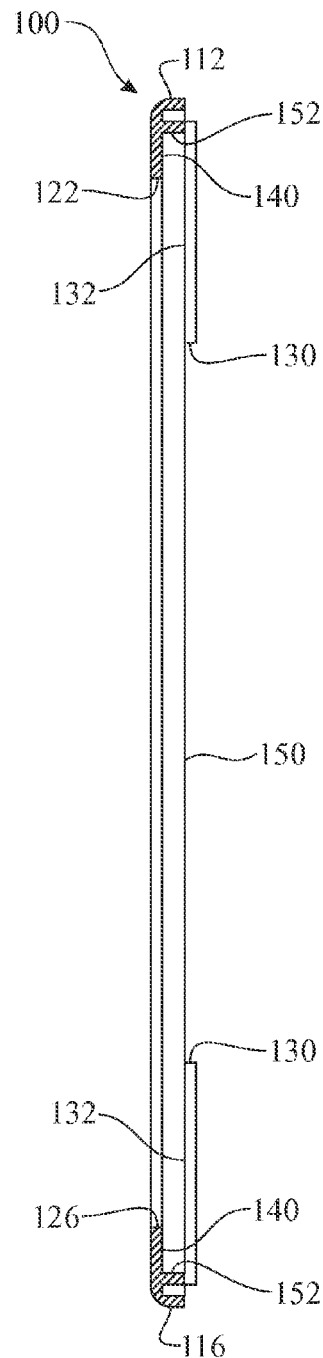
FIG. 7 presents a sectioned elevation view of the license plate frame, the section being taken along section line 8-8 of FIG. 6, the illustration being exclusive of the registration plate.
Figure 8:
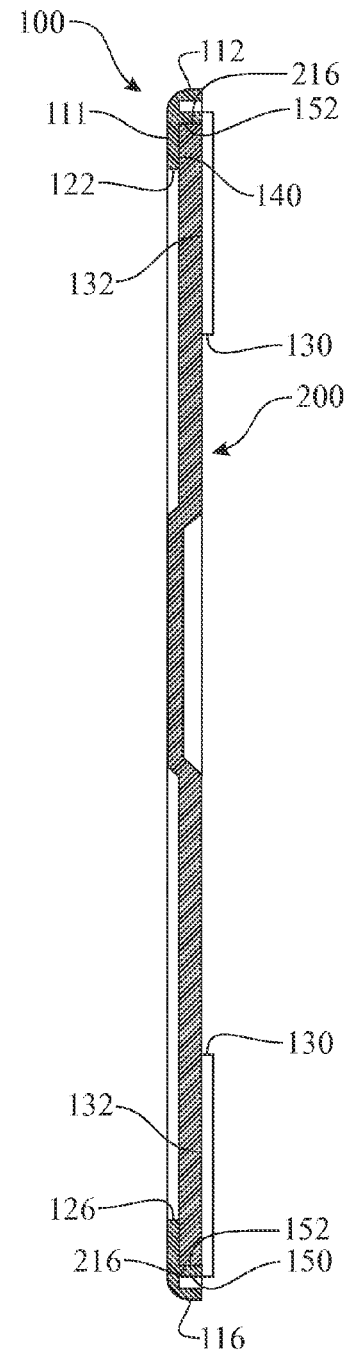
FIG. 8 presents a sectioned elevation view of the license plate frame, the section being taken along section line 8-8 of FIG. 6, the illustration being inclusive of the registration plate.

The exemplary embodiment of the license plate frame 100 is illustrated and detailed in FIGS. 1 through 8. The license plate frame 100 is fabricated having a license plate frame body 110. Orientation of the license plate frame body 110 is referenced by a license plate frame viewed surface 111 and a license plate frame mounting surface 118 (FIG. 5). The license plate frame body 110 can have a planar license plate frame viewed surface 111 as illustrated or a three-dimensional license plate frame viewed surface 111. The designer can incorporate artwork, lettering, and the like (not shown) in the license plate frame viewed surface 111. The license plate frame body 110 has a continuous exterior peripheral edge defined by a frame peripheral upper longitudinal edge 112, a pair a frame peripheral side edges 114, and a frame peripheral lower longitudinal edge 116. The license plate frame 100 includes an unobstructed registration plate viewing opening or area 120 formed passing through a central region of the license plate frame body 110. The unobstructed registration plate viewing area 120 is defined by a continuous interior peripheral edge of the license plate frame body 110, wherein the continuous interior peripheral edge is defined by a plate viewing area upper longitudinal edge 122, a pair a plate viewing area vertical edges 124, and a plate viewing area lower longitudinal edge 126. The exterior peripheral edge is preferably designed having a rectangular shape. The interior peripheral edge is also preferably designed having a rectangular shape. The interior peripheral edge is preferably sized and shaped to ensure all of the indicia (registration identifier 240, jurisdiction identifier 242, and expiration identifier 244) of a standard registration plate 200 are unobstructed by the license plate frame 100.

A license plate peripheral support wall 150 projects outward from the license plate frame mounting surface 118 of the license plate frame body 110 as illustrated in FIG. 5. The license plate peripheral support wall 150 is sized and shaped to contour to and receive the peripheral edge of the registration plate 200. The license plate peripheral support wall 150 extends rearward from the license plate frame mounting surface 118 to a distance ensuring engagement with the plate peripheral edge 212, 214, 216. The license plate peripheral support wall 150 is preferably located at a setback distance from the continuous interior peripheral edge 122, 124, 126 forming a plate surface retention lip 140. The peripheral wall, and, hence, the setback and corresponding plate surface retention lip 140, are preferably substantially equidistant and parallel to respective portions of the continuous interior peripheral edge 122, 124, 126.

One or more license plate retention tabs 130 are integrated into the license plate frame 100. Each license plate retention tab 130 is located distally on the support wall and substantially parallel to the license plate frame mounting surface 118 forming a gap between the plate surface retention lip 140 and the license plate retention tab exterior surface 132. Each license plate retention tab 130 is oriented extending inward from the license plate peripheral support wall 150 or towards a center of the unobstructed registration plate viewing area 120. A frame mounting aperture 134 is formed through each license plate retention tab 130. The arrangement of the plurality of frame mounting apertures 134 is designed to mimic and align with the pattern formed by the plurality of license plate fastener receiving apertures 334. The frame mounting apertures 134 are preferably shaped as an elongated slot, wherein the shape enables adjustments for positioning of the license plate frame 100 and respective registration plate 200 as well as providing compensation for tolerances and slight design and manufacturing variations between vehicles.

The license plate frame 100 is preferably fabricated of a molded plastic. Alternative materials for fabrication of the license plate frame 100 can include metal, composites, nylon, wood, and the like. The license plate frame 100 can retain a natural finish or the surface can be treated using at least one of any suitable finishing process, including plating, anodizing, polishing, painting, powder coating, adhesion of labels, and the like.

The registration plate 200 is assembled to the license plate frame 100 by bending the license plate frame body 110 as illustrated in FIGS. 3 through 5. The license plate frame 100 is bent forming an arch 160 along the longitudinal length thereof. The arch 160 enables the registration plate 200 to pass over the license plate peripheral support wall 150 and in front of the license plate retention tab exterior surface 132 of the license plate retention tabs 130. The registration plate substrate 210 is slideably inserted into the license plate frame 100 locating the peripheral edge of the registration plate substrate 210 within a gap formed between the plate surface retention lip 140 and the license plate retention tab exterior surface 132 as best shown in the illustration presented in FIG. 8. The registration plate substrate 210 continues to be inserted into the license plate frame 100 until the plate peripheral side edge 214 engages with a distal vertical edge engaging wall 152 of the license plate peripheral support wall 150. Simultaneously, the proximal plate peripheral side edge 214 passes a respective proximal vertical edge engaging wall 152 of the license plate peripheral support wall 150. The force retaining the license plate frame body 110 in an arch 160 is removed, allowing the license plate frame body 110 to return to a planar shape. When the registration plate 200 is properly positioned within the license plate frame 100, the plate mounting apertures 234 are aligned with the frame mounting apertures 134. The unobstructed registration plate viewing area 120 provides an unencumbered view of the registration plate viewed surface 211 of the registration plate 200, thus ensuring all of the provided indicia 240, 242, 244 are clearly visible. The unobstructed registration plate viewing area 120 also enables placement or replacement of the expiration identifier 244, when the expiration identifier 244 is provided as a decal.

The assembly comprising the registration plate 200 inserted within the license plate frame 100 is subsequently affixed to the motor vehicle 300 using a plurality of license plate fasteners 194. Each of the plurality of license plate fasteners 194 is inserted through a respective plate mounting aperture 234, passing through the respective frame mounting aperture 134 and into or threadably engaging with the license plate fastener receiving apertures 334 as illustrated in FIG. 2. Each license plate fastener 194 can be provided as any suitable temporary or permanent registration plate attachment fastener, including a threaded bolt, a threaded screw, a rivet, and the like. The license plate fastener receiving apertures 334 can be a threaded pem nut, a welded threaded nut, a captured threaded nut, a through hole (which would utilize a loose nut for attachment thereof), and the like.

The frame body may be modified such that the support wall is 150 is not included, and the one or more retention tabs 130 extend from the edges 122, 124 and/or 126, and/or the one or more retention tabs extend from the mounting surface 118 of the frame body 100. In this way, a vehicle identification plate can be displayed without covering any areas that the user desires to expose while still being mounted to a vehicle using a mounting plate 100 which can be decorated or otherwise customized.

Although the exemplary embodiment integrates the license plate peripheral support wall 150 at a setback from the continuous interior peripheral edge forming the plate surface retention lip 140, it is understood that the license plate peripheral support wall 150 can be located in alignment with the continuous interior peripheral edge, eliminating the plate surface retention lip 140. The license plate retention tab 130 would be sandwiched between the registration plate mounting surface 218 and the license plate backing surface 321, thus retaining the license plate frame 100 in position.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claim is:

1. A frame for associating a vehicle identification plate with a vehicle, the plate having a front, viewed, plate surface and a rear, vehicle-facing, plate surface, the viewed plate surface bearing identification indicia, the plate defining a peripheral edge, the frame comprising:

a frame body having a first, viewed, frame surface and a second, mounting, frame surface, the frame body defining a plate viewing opening, the frame body being defined by upper and lower longitudinal edges and left and right peripheral side edges;

an inner peripheral support wall having left and right wall members extending from the mounting frame surface sized and shaped to receive the identification plate in nesting relation, the left and right wall members being spaced apart by a distance which is less than a distance between the left and right peripheral side edges such that the first, viewed, frame surface has an exposed area for artwork or other media to be placed thereon;

at least one retention tab extending from the support wall substantially parallel to the mounting frame surface and forming a gap between the mounting frame surface and the at least one retention tab into which a portion of the identification plate is adapted to be placed.

2. The frame of claim 1, wherein the frame has four retention tabs extending from the peripheral support wall, each of which forms a corresponding gap between the mounting frame surface and the corresponding retention tab into which a portion of the identification plate is adapted to be placed after bending the frame to allow for insertion of the identification plate such that the retention tabs keep the identification plate immobile within the mounting frame.

3. The frame of claim 2, wherein each retention tab defines a fastener receiving aperture adapted to align with a corresponding fastener receiving aperture defined by the vehicle.

4. The frame of claim 2, wherein the frame body is flexible such that it can be bent to receive the identification plate during attachment of the identification plate to the frame body.

5. The frame of claim 1, wherein the frame has two retention tabs extending from the support wall, each of which forms a corresponding gap between the mounting frame surface and the corresponding retention tab into which a portion of the identification plate is adapted to be placed after bending the frame to allow for insertion such that the retention tabs keep the identification plate immobile within the mounting frame.

6. A frame for associating a vehicle identification plate with a vehicle, the plate having a front, viewed, plate surface and a rear, vehicle-facing, plate surface, the viewed plate surface bearing identification indicia, the plate defining a peripheral edge, the frame comprising:

a frame body having a first, viewed, frame surface and a second, mounting, frame surface, the frame body defining a plate viewing opening, the frame body being defined by upper and lower longitudinal edges and left and right peripheral side edges;

the frame body further comprising an inner peripheral support wall having left and right wall members which are spaced apart by a distance which is less than a distance between the left and right peripheral side edges such that the first, viewed, frame surface has an exposed area such that artwork or other media can be placed thereon;

at least one retention tab extending from the inner peripheral support wall into at least partial registry with the plate viewing opening, the at least one retention tab adapted to connect the vehicle identification plate, using a fastener, to the frame body in substantial registry with the viewing opening, the at least one retention tab adapted to be placed in at least partial register with the vehicle-facing plate surface of the vehicle identification plate.

7. The frame of claim 6, wherein the frame has four retention tabs extending from the mounting frame surface, each of which is adapted to connect the vehicle identification plate, using a separate fastener for each retention tab, to the frame body in substantial registry with the viewing opening, each retention tab adapted to be placed in mating engagement with the vehicle-facing plate surface of the vehicle identification plate and further adapted to keep the identification plate immobile within the mounting frame.

8. The frame of claim 7, wherein each retention tab defines a fastener receiving aperture adapted to align with a corresponding fastener receiving aperture defined by the vehicle.

9. The frame of claim 6, wherein the frame has two retention tabs extending from the mounting frame surface, each of which is adapted to connect the vehicle identification plate, using a separate fastener for each retention tab, to the frame body in substantial registry with the viewing opening, each retention tab adapted to be placed in mating engagement with the vehicle-facing plate surface of the vehicle identification plate and further adapted to keep the identification plate immobile within the mounting frame.

10. A license plate frame for mounting a vehicle identification plate to a vehicle, the vehicle identification plate having a thickness and defining at least one mounting aperture, comprising:

a frame body having a first, viewed, surface and a second, mounting, surface, the frame body defining an identification plate viewing aperture forming a substantially unobstructed license plate viewing area, the frame body bounded between left and right peripheral side edges and upper and lower longitudinal edges, the frame body including an interior peripheral support wall within which is adapted to be placed a vehicle identification plate in nesting relation having left and right wall members, the left and right wall members being spaced apart by a distance which is less than a distance between the left and right peripheral side edges, such that the first, viewed, frame surface has exposed areas, respectively, between edges of the viewing area and the left and right side edges on which artwork or other media can be displayed;

at least one identification plate retention tab extending from the support wall into at least partial registry with the plate viewing aperture, each of the at least one identification plate retention tabs being spaced from the mounting surface such that a gap formed between mounting surface of each of the at least one retention tabs is of a dimension approximately that of the thickness of the identification plate; and a frame mounting aperture formed through each of the at least one identification plate retention tabs, wherein each frame mounting aperture is adapted to be located in registration registry with a corresponding mounting aperture defined by the vehicle identification plate when the vehicle identification plate is nested with the support wall.

11. The frame of claim 10, wherein the frame has four retention tabs extending from the peripheral support wall, each of which forms a corresponding gap between the mounting frame surface and the corresponding retention tab into which a portion of the identification plate is adapted to be placed after bending the frame to allow for insertion of the identification plate such that the retention tabs keep the identification plate immobile within the mounting frame.

12. The frame of claim 11, wherein each frame mounting aperture is adapted to align with a corresponding fastener receiving aperture defined by the vehicle.

13. The frame of claim 11, wherein the frame body is flexible such that it can be bent to receive the identification plate during attachment of the identification plate to the frame body.

14. The frame of claim 10, wherein the frame has two retention tabs extending from the support wall, each of which forms a corresponding gap between the mounting frame surface and the corresponding retention tab into which a portion of the identification plate is adapted to be placed after bending the frame to allow for insertion such that the retention tabs keep the identification plate immobile within the mounting frame.

15. A method for mounting a vehicle identification plate to a vehicle, the plate having a front, viewed, plate surface and a rear, vehicle-facing, plate surface, the viewed plate surface bearing identification indicia, the plate defining a peripheral edge, comprising the steps of:

providing a vehicle identification plate mounting frame, the frame comprising:

a frame body having a first, viewed, frame surface having and a second, mounting, frame surface, the frame body defining a plate viewing opening, the frame body being defined by upper and lower longitudinal edges and left and right peripheral side edges;

an inner peripheral support wall having left and right wall members extending from the mounting frame surface sized and shaped to receive the identification plate in nesting relation;

said left and right wall members being spaced apart by a distance which is less than a distance between the left and right peripheral side edges such that the first, viewed, frame surface has an exposed area such that artwork or other media can be placed thereon;

at least one retention tab extending from the support wall substantially parallel to and in partial registry with the mounting frame surface, each retention tab forming a gap between the mounting frame surface and the corresponding retention tab into which a portion of the identification plate is adapted to be placed;

bending the frame body to expose at least one of the gaps formed between the at least one retention tab and the mounting frame surface so as to permit the identification plate to pass under the at least one retention tab and over the support wall;

inserting one or more respective portions of the identification plate into the at least one gaps until the identification plate nests with the support wall; and fastening the identification plate to the frame body.

16. The frame of claim 15, wherein the frame has four retention tabs extending from the peripheral support wall, each of which forms a corresponding gap between the mounting frame surface and the corresponding retention tab into which a portion of the identification plate is adapted to be placed after bending the frame to allow for insertion of the identification plate such that the retention tabs keep the identification plate immobile within the mounting frame.

17. The frame of claim 16, wherein each retention tab defines a fastener receiving aperture adapted to align with a corresponding fastener receiving aperture defined by the vehicle.

18. The frame of claim 16, wherein the frame body is flexible such that it can be bent to receive the identification plate during attachment of the identification plate to the frame body.

19. The frame of claim 15, wherein the frame has two retention tabs extending from the support wall, each of which forms a corresponding gap between the mounting frame surface and the corresponding retention tab into which a portion of the identification plate is adapted to be placed after bending the frame to allow for insertion of the identification plate such that the retention tabs keep the identification plate immobile within the mounting frame.

* * * * *